United States Patent [19]

Edwards

[11] 4,417,715
[45] Nov. 29, 1983

[54] REVERSIBLE TRANSPORTATION SEAT

[75] Inventor: Robert L. Edwards, Mansfield, Ohio

[73] Assignee: National Seating Co., Mansfield, Ohio

[21] Appl. No.: 240,771

[22] Filed: Mar. 5, 1981

[51] Int. Cl.³ .................... F16M 13/00; A47C 3/18
[52] U.S. Cl. .................................. 248/425; 297/349
[58] Field of Search ...................... 297/349; 248/425

[56] References Cited

U.S. PATENT DOCUMENTS

| 1,766,079 | 6/1930 | Knight et al. | 297/349 X |
| 2,124,501 | 7/1938 | Willoughby | 248/425 |
| 2,148,187 | 2/1939 | Burnham | 248/425 |
| 2,200,904 | 5/1940 | Van Derveer | 248/425 |
| 2,472,349 | 9/1949 | Smith | 248/425 |
| 2,869,615 | 1/1959 | Austin | 248/425 |
| 4,091,740 | 5/1978 | Lie | 297/349 |

FOREIGN PATENT DOCUMENTS 1022549 12/1952 France .............................. 297/349

409792 5/1934 United Kingdom ................ 248/425

Primary Examiner—Francis K. Zugel
Attorney, Agent, or Firm—Maky, Renner, Otto & Boisselle

[57] ABSTRACT

A reversible seat includes a fixed lower frame, a selectively rotatable upper frame carrying the seat, a slot and roller connection means between the lower and upper frames selectively to permit the upper frame to be rotated relative to the lower frame to reverse the seat and locking means to secure the upper frame to the lower frame for seat use. The slot and roller connection means includes a Y-shape slot and a pivotal switch lever associated with the slot positively and sequentially to control the movement of the rollers along the respective legs of the Y-shape slot. The locking means includes a spring loaded pivotal latch on the lower frame having at least one hook selectively encircling at least one locking stud on the upper frame to bias the upper frame into positive interlocked engagement with the fixed frame at both ends of the respective frames.

13 Claims, 11 Drawing Figures

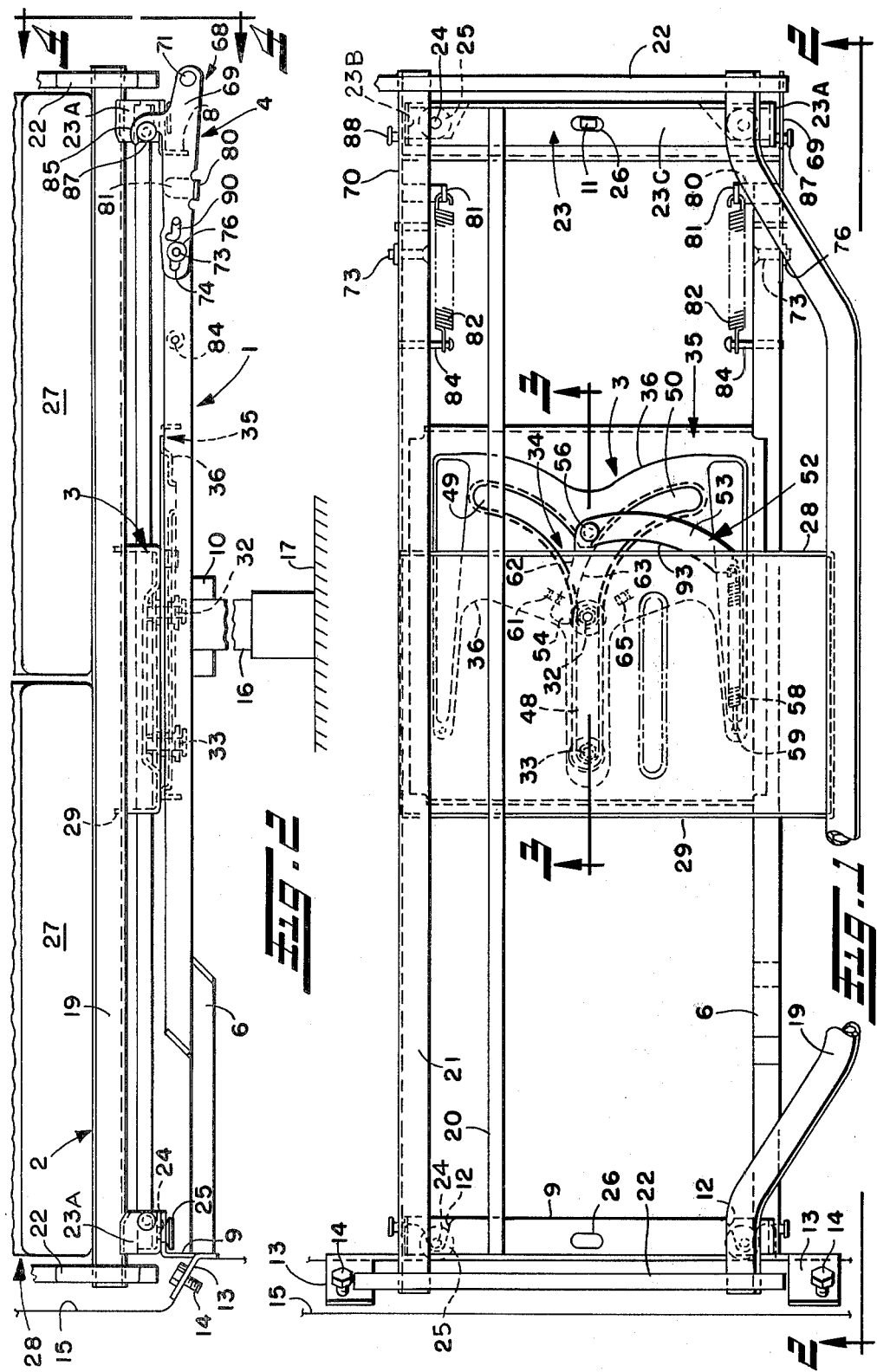

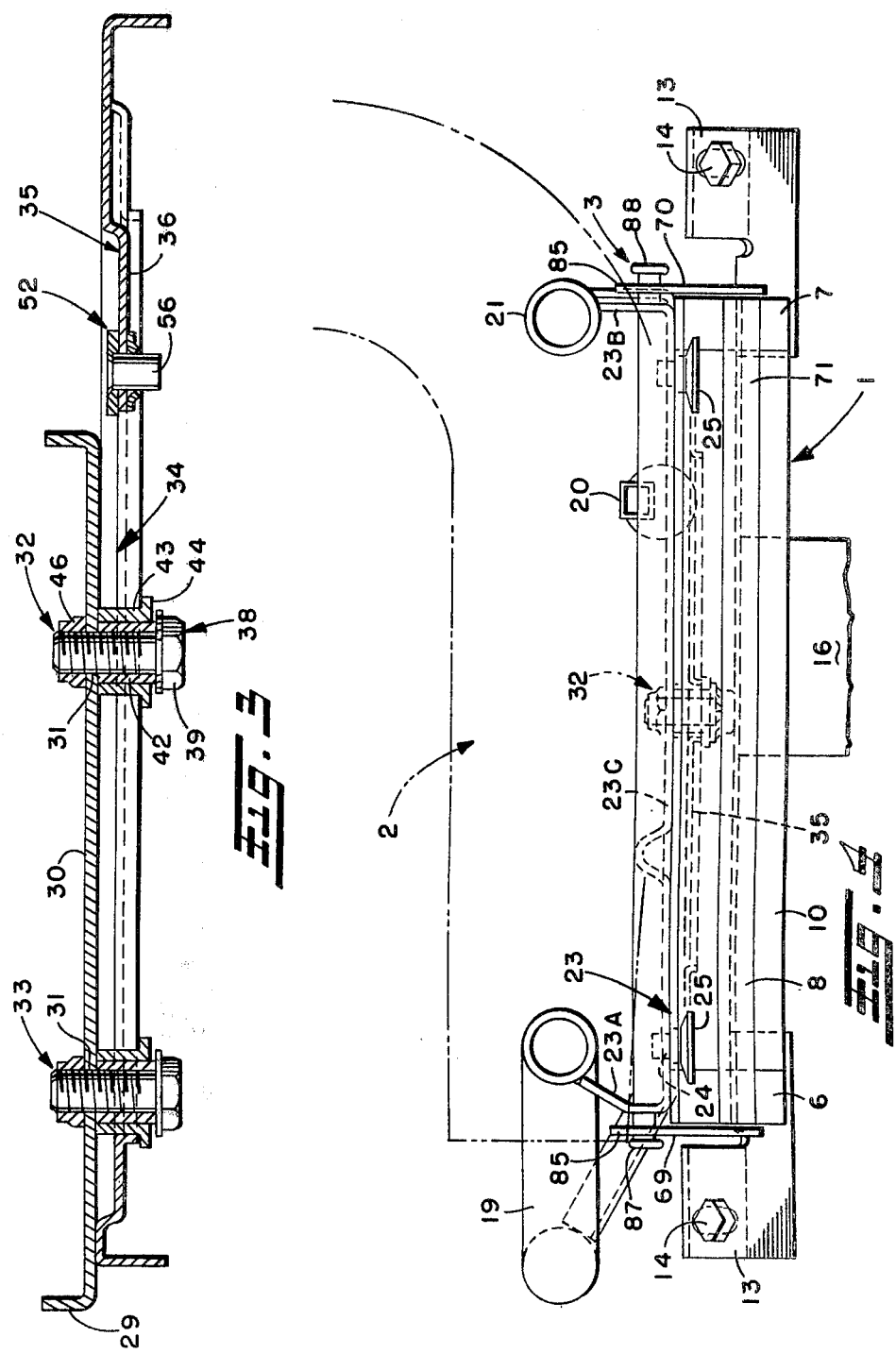

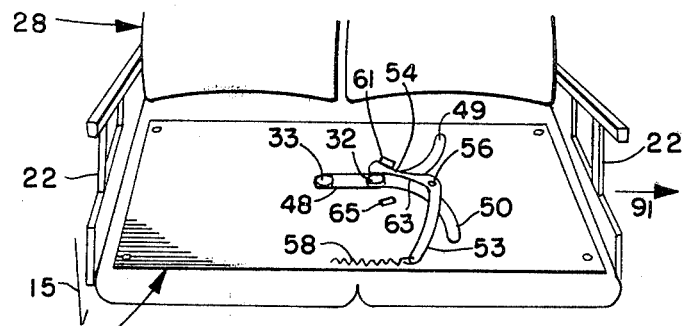
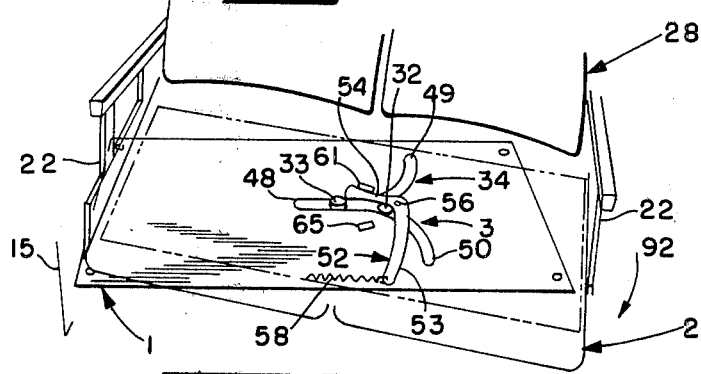
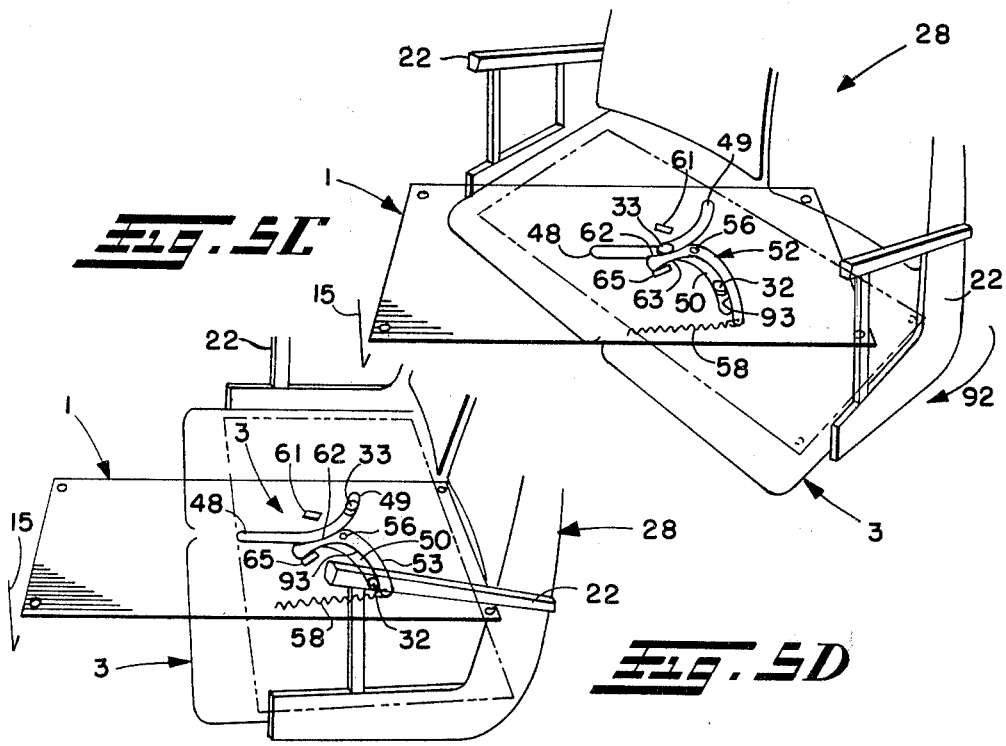

U.S. Patent   Nov. 29, 1983   Sheet 4 of 4   4,417,715
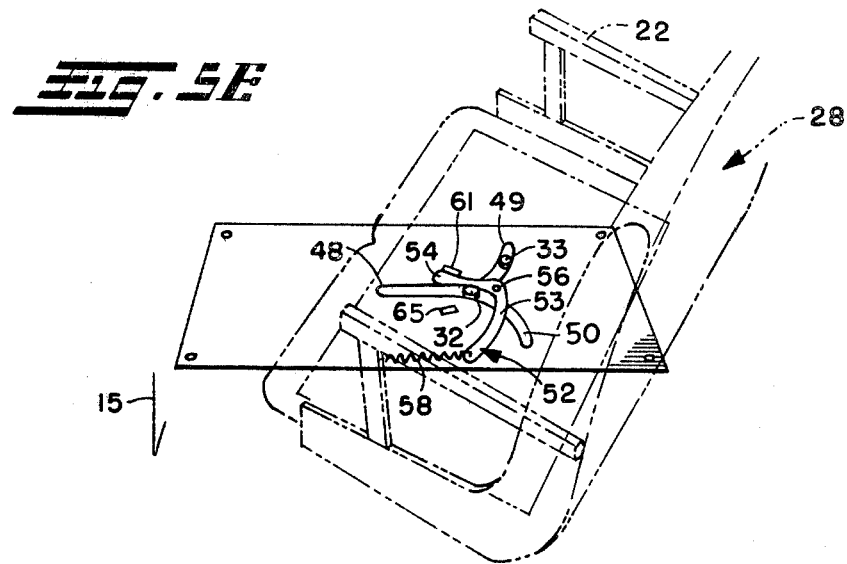
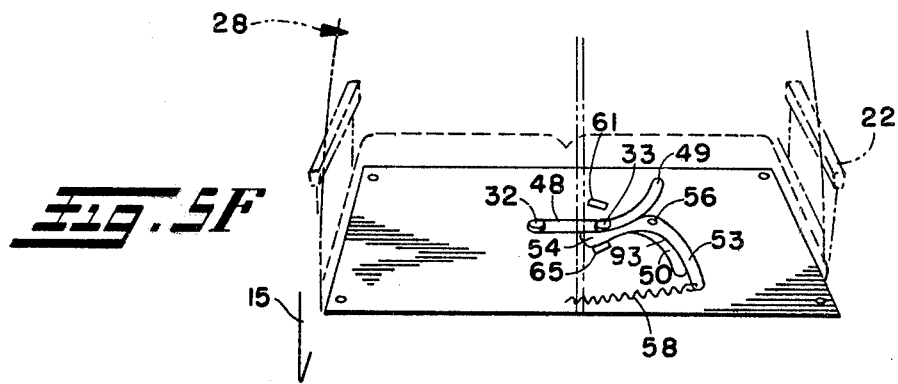
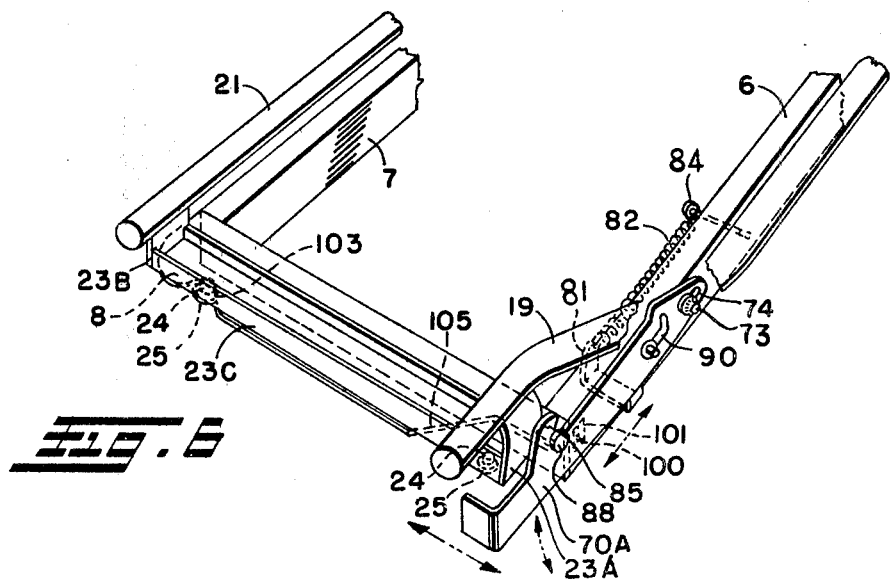

REVERSIBLE TRANSPORTATION SEAT

BACKGROUND OF THE INVENTION

The present invention relates as indicated to a reversible seat in general and to a smoothly and easily rotated reversible seat with readily implemented locking mechanism in particular.

Reversible seats have been used for years, primarily in inter-city buses. The reversibility of one or more seats in such buses permits custom seating patterns to be achieved for specified passenger load requirements and/or usages as often encountered in tour groups, for example. These reversible seats have included various structural forms to allow the seat to be rotated from a forwardly facing to a rearwardly facing position and vice versa.

For example, seats have been made reversible by completely disengaging the seat frame from the lower fixed frame, manually reversing the seat, and then reconnecting the seat frame to the lower frame. Alternatively, various structural means have been implemented between the rotating upper seat frame and the lower fixed frame to accomplish such reversibility, as exemplified by U.S. Pat. Nos. 2,200,904; 2,372,495; 3,394,964; and 3,860,283 and Canadian Pat. No. 482,859. The various structural embodiments, which are employed between the revolving upper seat frame and the lower fixed frame or base in these patents, are relatively complex requiring specialized assembly, maintenance, locking and/or labor procedures to be used.

In addition to the reversal structure shown in the above noted patents, T-shape and Y-shape slot and roller interconnections have been disclosed for reversing car and bus seats as respectively shown in U.S. Pat. Nos. 2,063,674 and 2,472,349. This type of interconnection structure is not quite as complex as the interconnection structure shown in the noted patents and should reduce some of the problems attendant to the use of that structure.

SUMMARY OF THE PRESENT INVENTION

The principal object of the present invention is to provide a seat that can be easily reversed and locked by one person with the rotational movement of the seat between positions being well guided for smooth operation.

It is another object of the present invention to provide a Y-shape slot and roller connection between the rotatable upper seat frame and the fixed lower frame having the rollers guided by a spring biased switch lever associated with the Y-shape slot. The spring loaded switch lever cooperatively interacts with the rollers in the Y-shape slot sequentially to guide the same along the branches of the slot during selective 180° rotation of the seat in opposite arcuate directions.

It is yet another object of the present invention to provide a locking mechanism positively to secure the upper frame to the lower frame without alignment problems. This locking mechanism includes a spring loaded lock lever assembly on the lower fixed frame having at least one hook selectively to encircle at least one locking stud on the upper frame to bias the upper frame into an interlocked and dimensionally stabilized relationship with the lower frame. At the wall end, this interlocking is accomplished by locking pins on the upper frame being received in slots on the lower frame. At the aisle end, this interlocking is accomplished by two hooks and a lanced catch between the frames or alternatively by a single hook and a locking pin on the upper frame being received in a slot on the lower frame.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

BRIEF DESCRIPTION OF THE DRAWINGS

In the drawings:

FIG. 1 is a plan view of the reversible seat of the present invention with the seat cushions removed for clarity of illustration better to show the rotatable upper frame and fixed lower frame with the slot and roller connection therebetween;

FIG. 2 is a front elevation taken generally along the lines 2—2 in FIG. 1 showing the upper rotatable seat frame locked to the lower fixed frame;

FIG. 3 is an enlarged front section of the slot and roller connection between the upper and lower frames taken along line 3—3 of FIG. 1;

FIG. 4 is a fragmentary end elevation of the reversible seat of the present invention taken along line 4—4 of FIG. 1 looking from the aisle toward the wall of the bus in which the seat is mounted;

FIGS. 5A–5F are schematic illustrations of the reversible seat of the present invention sequentially illustrating the cooperative operation between the Y-shape slot and roller connection and the switch lever associated therewith during the swinging reversal of the seat from its forwardly facing use position of FIG. 5A to its rearwardly facing use position of FIG. 5F; and FIG. 6 is a fragmentary perspective showing another latching embodiment according to the present invention selectively to secure the upper frame to the lower frame.

DETAILED DESCRIPTION OF THE PREFERRED EMBODIMENT

The reversible seat of the present invention includes a fixed lower frame, indicated generally at 1, a rotatable upper seat frame, indicated generally at 2, a Y-shape slot and roller connection means, indicated generally at 3, to connect the fixed lower frame 1 to the upper rotatable frame 2, and a locking assembly, indicated generally at 4, positively to secure the upper frame to the lower frame at the seat use positions. A description of each of these principal structural components of the present invention is set forth below, followed by a brief operational statement for the reversible seat of the present invention.

The Fixed Lower Frame 1

The fixed lower frame includes a front rail assembly 6 and a rear rail assembly 7 interconnected by an aisle angle 8, a wall angle 9, and intermediate stretcher 10. The aisle angle 8 has an upwardly projecting lanced catch 11 on its horizontal web. The wall angle 9 has two spaced locking slots 12 in its horizontal web and has two wall mounting brackets 13 formed at its opposite ends. The wall brackets 13 are fastened at 14 to the wall 15 of the bus or other vehicle. The wall connection may be the sole source of support of the present invention for cantilever type seating or may be used in conjunction with a pedestal 16 to support the fixed frame. As shown, the pedestal 16 is secured at its lower end to an elongated trackway in floor 17 and at its upper end to the stretcher 10 of the fixed frame 1. This fixed frame 1 has a selectively rotatable upper seat frame 2 mounted thereon.

The Rotatable Upper Frame 2

The rotatable upper frame 2 includes a front rail assembly 19, a cushion rest rail 20 and a rear rail assembly 21 interconnected at their respective ends by identical arm assemblies 22 and identical locking angles, indicated generally at 23. As best shown in FIG. 4, the locking angles are generally U-shape in end view and have two downwardly extending spaced legs 23A and 23B respectively connected at their upper ends to front rail 19 and rear rail 21 and interconnected at their lower ends by flat brace 23C. The flat brace 23C of each locking angle 23 has two spaced downwardly extending locking pins 24 thereon, which include enlarged tapered heads 25 at their lower ends. Each flat brace 23C also has a central catch aperture 26.

The upper frame is symmetrical about its imaginary longitudinal center line, which parallels wall 15 of the vehicle. The upper frame 2 supports seat cushions 27 and a reclining seat back with cushions indicated generally at 28 in FIG. 5. The upper frame 2 is reversibly connected to the lower fixed frame 1 by a Y-shape slot and roller connection assembly 3.

Y-Shape Slot and Roller Connection Assembly

The Y-shape slot and roller connection assembly indicated generally at 3 includes a center open top guide box 29 secured at its opposite ends to front rail 19 and rear rail 21 and extending downwardly therefrom. The bottom of the open top box 29 provides a center pivot mounting plate 30 generally extending between, but below the plane of, the front rail assembly 19 and rear rail assembly 21 of the rotatable upper frame 2. The center pivot mounting plate 30 has two spaced holes 31 therein used fixedly to secure a first roller assembly indicated generally at 32 and a second roller assembly indicated generally at 33. The first and second roller assemblies 32 and 33 are received in a Y-shape slot, indicated generally at 34, provided in center guide plate 35 extending between and connected to the front rail assembly 6 and rear rail assembly 7 of the fixed lower frame 1. The guide plate 35 has a depressed center section or well 36 to provide clearance for the roller movement and to enclose the roller and guide structure to reduce tampering and dirt accumulation. The first and second roller assemblies 32 and 33, received in the slot 34 and fixedly secured to the center pivot mounting plate 30, are identical in construction so that only one will be described hereinafter.

As best shown in FIG. 3, the first roller assembly 32 includes a bolt 38 having a head 39 and threaded shank 40. The shank 40 is surrounded adjacent the head 39 of bolt 38 by an annular sleeve 42, which is encircled by a rotatable roller 43 having a bottom annular shoulder 44. The bolt 38 with sleeve 42 and roller 43 assembled thereon is then passed upwardy through the slot 34 in center guide plate 35 until the sleeve 42 abuts the bottom surface of the center pivot mounting plate 30. In such position, the shank 40 of bolt 38 extends upwardly at its free end through hole 31 in center pivot mounting plate 30 and is fixedly secured in such position by a nut 46 being threaded downwardly thereon into engagement with plate 30. As thus secured, the roller assemblies are movably captured within the slots 34 in rolling engagement with the sidewalls thereof and are vertically stabilized in such position by the shoulders 44 adjacent slot 34.

The first and second roller assemblies 32 and 33 may move smoothly along the Y-shape slot indicated generally at 34 in the center guide plate 35 secured to the fixed roller frame 1. As best shown in FIG. 1, the generally Y-shape slot includes a stem portion 48 and two divergent arcuate branch sections 49 and 50. The two roller assemblies 32 and 33 are received in the stem 48 of the Y-shape slot 34 when the seat is in either its forwardly facing or rearwardly facing position of operation. In its forwardly facing position, the second roller assembly 33 abuts the blind end of the slot stem 48 and the first roller assembly 32 is at the throat of the diverging slot branches 49 and 50.

To reverse the seat, the upper frame 2 is rotated relative to the lower frame 1 with this swinging movement being permitted by the roller assemblies 32 and 33 moving along the stem 48 and branches 49 and 50 of the Y-shape slot in controlled sequence. This control of the roller assemblies 32 and 33 is provided by a switch lever, indicated generally at 52.

The switch lever 52 is generally L-shape in configuration, and preferably has a long arm 53 and a short arm 54. The switch lever 52 is pivotally connected to the center guide plate 35 of the fixed lower frame 1 by a pivot pin 56. As best shown in FIG. 1, this pivot pin 56 passes through and is secured to the switch lever 52 at the junction of its two arms 53 and 54 and is pivotally secured to center guide plate 35 between the two divergent arcuate branch sections 49 and 50 of the Y-shape slot 34.

The switch lever 52 is biased in a clockwise direction about pivot pin 56 as viewed in FIG. 1 by a spring 58 connected at one end to the free end of long arm 53 of the switch lever 52 and connected at its other end to a tab 59 on center guide plate 35. This clockwise movement under the bias of spring 58 is limited by a first stop 61 on guide plate 35 engaging one side 62 of the short arm 54 adjacent its free end. As best shown in FIG. 1, the first stop 61 is provided on center guide plate 35 of fixed frame 1 adjacent the throat of Y-shape slot 34. The switch lever 52 can pivot when cammed in a counter-clockwise direction as shown in FIG. 1 against the bias of spring 58 until the other side 63 of short arm 54 engages a second stop 65. As best shown in FIG. 1, the second stop 65 is provided on center guide plate 35 of fixed frame 1 adjacent the throat of the Y-shape slot indicated generally at 34. The second stop 65 is on the opposite side of the slot 34 from first stop 61.

Movement of the first and second rollers 32 and 33 along Y-shape slot 34 by rotating the upper frame relative to the lower fixed frame is sequentially controlled by the pivotal movement of the switch lever between its two arcuate positions against stops 61 and 65, as described in detail below in the operational statement. When the rotational movement has been completed to reverse the seat, the first and second roller assemblies 32 and 33 have been returned to the slot stem 48 in reverse order to then permit the upper frame rigidly to be secured to the lower frame by the locking mechanism indicated generally at 4.

Locking Mechanism 4

The locking mechanism located generally at 4 includes a lock handle assembly indicated generally at 68 pivotally mounted toward the aisle end of fixed frame 1. The lock handle assembly includes a latch lever 69 pivotally mounted to front rail 6, a second identical latch lever 70 pivotally mounted to back rail assembly 7 and a tie rod 71 extending between and connected at its opposite ends to the aisle end of switch levers 69 and 70. As thus interconnected, the switch levers 69 and 70 swing equal arcuate distances about their pivotal connections to the fixed frame 1. Since the pivotal connections are identical in configuration, only one such pivot is described with the understanding that the description applies equally to both.

In this regard, a pivot pin 73 is secured to front rail 6 and extends forwardly therefrom through an elongated aperture 74 in the proximal end of latch lever 69. The forward end of pivot pin 73 is capped by push-on nut 76 to retain the latch lever 69 in position about pivot pin 73. The latch lever 69 may selectively be moved axially because the fixed pivot pin is received in an elongated slot 74 in such latch lever 69. As shown in FIG. 2, the latch lever is spring biased normally to bring the right-hand end of slot 74 into abutment with the pivot pin 73 to keep the latch lever 69 and entire lock handle assembly 68 retracted relative to the vehicle aisle.

To this end, the switch lever 69 has a U-shape member 80 integrally formed therewith to extend under and up the other side of front rail 6. The vertical leg 81 of the U-shape member 80 has one end of spring 82 secured thereto. The other end of spring 82 is connected to a retainer 84 fastened to front rail 6 of fixed frame 1. This spring 82 normally biases the latch lever 69 toward wall 15 to bring the right end of elongated slot 74 into abutment with pivot pin 73 as shown in FIG. 1. This latch lever position is assumed when the upper frame is locked to the lower frame.

This lock is effectuated by upstanding hooks 85 on latch levers 69 and 70. These hooks partially encircle locking studs 87 and 88 respectively extending outwardly from vertical legs 23A and 23B on end lock angle 23 of upper frame 2. The hooks 85 are held in their locking positions about the locking studs 87 and 88 by the bias of springs 82. The thus biased and secured hooks positively urge the upper frame 2 toward the wall 15 for positive interlock with the fixed frame. The hooks 85 also restrain the aisle end of such frame 2 from moving vertically upwardly because of the hooks overlying studs 87 and 88.

The positive interlock between the upper and lower frames at the wall end of the seat is provided by the locking pins 24 on upper frame 2 being received in and bottoming out on the two spaced locking slots 12 in the wall locking angle 9 of fixed frame 1, with alignment between the pins 24 and slots 12 being provided by the Y-shape slot and roller connection 3. As thus received, the tapered heads 25 of locking pins 24 bear against the bottom surface of the horizontal web of angle 9 adjacent the slots 12 to eliminate any upward movement or looseness in the upper frame 2. The positive interlock at the aisle is provided not only by the lock handle assembly as above described but also by the lanced catch 11 on the fixed frame being received in the catch aperture 26 on the upper rotatable frame 2. The positive interlocks provided by the spring biased latch lever assembly 68 and cooperatively associated locking structure on the frames provide a seat having rigid structure during seat use. By a simple operation performed by one person, this seat may also be unlocked and the upper frame reversed when desired.

Operation of the Reversible Seat of the Preferred Embodiment of the Present Invention For purposes of this description, it will be assumed that the reversible seat of the present invention is initially facing forward with the upper frame locked to the lower frame as illustrated in FIGS. 1 and 2. To begin the reversal, tie rod 71 of lock handle assembly 68 is grasped and pulled away from the wall against the bias of springs 82, with this axial movement being permitted by the elongated slot 74 in the lock levers. When the hooks 85 move toward the aisle a sufficient distance to clear the locking studs 87 and 88, the lock lever assembly 68 is pivoted downwardly about pivot pins 73. This downward pivotal movement is limited by a bayonet pin and slot connection 90 respectively interconnecting latch levers 69 and 70 and the front and rear rails 6 and 7 of the fixed frame.

When the hooks 85 have thus been disengaged, the operator initiates the rotational movement of the seat by lifting up slightly on the aisle arm assembly 22 to permit aperture 26 on the locking angle 23 of the upper frame to clear the lanced catch 11 on the fixed lower frame. The upper frame 2 may then be pulled toward the aisle as indicated by arrow 91 in FIG. 5A to clear the locking pins 24 and heads 25 on the upper frame 2 from locking slots 12 on the lower frame 1.

With movement 91, the first roller assembly 32 and second roller assembly 33 move axially along stem 48 of Y-shape slot 34 slightly toward the vehicle aisle. The surface 63 of arm 54 on switch lever 52 guides roller assembly 32 in a smooth pattern toward branch 50 of Y-shape slot 34. The surface 63 of arm 54 is contoured as shown to provide a smooth radius between branch 50 and stem 48 positively to guide the roller assembly 32 through the throat of the Y-shape slot into branch 50. With this movement, the upper frame 2 begins to swing about the moving pivot defined by the traversal of roller assembly 33 as shown by the arrow 92 in FIGS. 5B and 5C.

During movement 92, the first roller assembly 32 engages inside surface 93 of long arm 53 on switch lever 52. This engagement, coupled with further movement of roller assembly 32 along branch 50 results in the arm 53 being cammed in a counterclockwise direction against the bias of spring 58. This camming action with consequent counterclockwise movement of the switch lever continues until the surface 63 of short arm 54 on switch lever 52 engages the second stop 65. In such position of the switch lever, the inside surface 93 of long arm 53 generally corresponds in radius to the slot branch 50 to permit first roller assembly 32 to move along such branch as illustrated in FIG. 5C.

With the arm 54 against stop 65, the branch 50 of Y-shape slot 34 is closed with the surface 62 of arm 54 then providing a smooth transition from stem 48 to branch 49. The open branch 49 with such smooth transition permits the second roller assembly 33 to move into and be guided along branch 49 as indicated in FIG. 5D. At the completion of a 90° swing of the upper seat frame 2, the first roller assembly 32 is positioned near the end of branch 50 and the second roller assembly 33 is positioned near the end of branch 49 as shown in FIG. 5D.

With continued rotation, the seat now begins to pivot about the second roller assembly 33 and the first roller assembly 32 begins to return along branch 50 toward stem 48 of Y-shape slot 34. In such movement, the first roller assembly 32 cams arm 54 out of the way into its position against stop 61, and arm 54 is held in this position by the bias of spring 58. This permits roller assembly 32 to return into stem 48 of Y-shape slot 34, as illustrated in FIG. 5E. This roller movement is coupled with the subsequent return of the second roller assembly 33 along branch 49 toward stem 48 of the Y-shape slot 34. This results in second roller assembly 33 camming arm 54 out of the way and into its position against stop 65. When the first roller assembly 32 abuts the blind end of stem 48, the 180° reversal of the upper frame 2 has been completed, and the second roller assembly 33 is now at the throat of the Y-shape slot 34. In such position, the second roller assembly 33 holds arm 54 of switch lever 52 against stop 65 and overcomes the bias of spring 58. As will be noted from comparing FIG. 5F to FIG. 5A, at the completion of the seat reversal, the first and second roller assemblies 32 and 33 have reversed their positions in the stem 48 of Y-shape slot 34 and the arm 54 of switch lever 52 has reversed its position to be against stop 65 instead of stop 61.

This roller assembly and switch lever reversal preconditions the Y-shape slot and roller connection of the reversible seat for subsequent movement from the newly obtained rearly facing position back to a forwardly facing position. This reversal, when desired, would be implemented in the same way by rotating the upper seat frame in the opposite arcuate direction with the second roller assembly 33 initiating such movement by entering branch 49 with the slot and roller movement thereafter being the reverse of that just described.

When the seat reversal has been completed, the locking pins 24 at the end of the upper frame now adjacent the wall have entered the locking slots 12 on the fixed frame 1. This entry is guided by the curved surfaces of the locking slots 12 as best shown in FIG. 1 to compensate for any slight swinging movement still being experienced before the 180° rotation is complete. As the locking pins 24 are thus received, the tapered locking head 25 bears against the under surface of the horizontal web of locking angle 9 on fixed frame 1 to preclude vertical movement of the upper frame adjacent the wall during seat use. The latch lever assembly 68 may be pivoted upwardly and then the springs 82 are permitted to draw the latch lever assembly 68 inwardly until the hooks 85 partially encircle the locking studs 87 and 88 to complete the lock. In such position, the latch lever assembly 68 positively secures the movable frame 2 to the fixed frame 1 as above described.

Description of an Alternative Embodiment for Locking Mechanism 4

Instead of using a lock handle assembly 68 including two latch levers 69 and 70 at opposite sides of the lower frame, a single latch lever 70A may be used at one side of the lower frame as shown in FIG. 6. Latch lever 70A is identical to levers 69 and 70 in the preferred embodiment except for an inwardly extending lance 100. When the hook 85 on latch lever 70A is secured around locking stud 88, the lance 100 is received in an aperture 101 in the outer tube wall of front rail assembly 6 to prevent inadvertent disengagement of the hook. The spring biased latch lever 70A cooperates with a pin and slot connection to interlock the two frames at the aisle end of the seat.

To this end, the horizontal web of aisle angle 8 has a slot 103 therein adjacent the end remote from lever 70A. The slot 103 receives the locking pin 24 in the operative locked positions of the seat, with the enlarged head 25 of pin 24 bearing against the bottom of the aisle angle 8 of fixed frame 1 to prevent vertical looseness of upper frame 2. The other locking pin 24 on the aisle end of the seat hangs freely from the upper frame because a cutout 105 is provided in aisle angle 8 to prevent interference. In contrast, both locking pins at the aisle end of the preferred embodiment hang freely since the lock handle assembly 68 independently provides two positive spaced connections between the two frames.

To disconnect the alternative locking mechanism, the latch lever 70A is initially moved slightly forwardly as indicated at 106 to free lance 100 from aperture 101. The latch lever may then be moved in the sequential action described above to remove hook 85 from locking stud 88 to permit seat reversal as described above.

Although the invention has been shown and described with respect to a preferred embodiment, it is obvious that equivalent alterations and modifications will occur to others skilled in the art upon the reading and understanding of this specification. For example, the reversible seat of the present invention, although illustrated and described in the context of a bus seat, could be used with any type of transportation seat including driver's seats, airplane seats, train seats, etc. The present invention includes all such equivalent alterations and modifications, and is limited only by the scope of the claims.

I claim:

1. A reversible seat comprising a fixed lower frame; a guide plate carried by the lower frame having a Y shape slot therein, said Y shape slot including a stem section communicating with two divergent arcuate branch sections to form a Y configuration; a rotatable upper frame carrying a seat and having two spaced roller means fixedly mounted thereon, said roller means being received in the Y shape slot for selective movement therealong to connect the fixed frame to the rotatable frame for selective reversal of the seat; a pivotal switch lever positively to control the sequence of roller movement along the Y shape slot selectively to permit 180° rotation of the upper frame relative to the lower frame to reverse the seat orientation, the pivotal switch lever being generally L shape in configuration to define two arms respectively selectively associated with the two branch sections of the Y shape slot; and locking means positively to secure the upper frame to the lower frame for seat use.

2. The reversible seat set forth in claim 1 wherein the pivotal switch lever at the junction of its two arms is pivotally mounted to the guide plate between the two branch sections of the slot.

3. The reversible seat set forth in claim 2 wherein the switch lever is spring biased at one end of its first arm and the arcuate movement of the second arm is limited by two opposed stops on opposite sides of the slot stem whereby the second arm may pivot alternately to extend across opposite branches of the slot.

4. The reversible seat of claim 3 wherein the two spaced roller assemblies are positioned in the stem of the slot when the seat is in either one of its two positions of use and the switch lever is in a spring biased position in which the second arm thereof is against one of the stops.

5. The reversible seat of claim 4 wherein the two spaced roller assemblies of claim 4 are respectively sequentially guided in their movement from the stem into opposite branches of the Y-shape slot by the switch lever arms during the first 90° of seat rotation and then cam the switch lever arms out of their way during the second 90° of seat rotation to return to the stem in reverse order at the completion of 180° of seat rotation, with the switch lever orientation then being in a second position in which the second arm thereof is held against the other stop by one of the roller assemblies requiring the seat to be subsequently rotated in the opposite arcuate direction to be reversed.

6. The reversible seat of claim 5 wherin the sides for the arms of the switch lever have radii of curvature substantially equal to the radii of curvature for the portions of the divergent branches with which they are selectively pivotally associated.

7. The reversible seat of claim 1 wherein the locking means includes a spring loaded latch assembly pivotally mounted to the fixed lower frame having hook means selectively to encircle locking stud means on the upper frame positively to bias the rotatable upper frame into locked engagement with the lower frame.

8. The reversible seat of claim 7 wherein the spring loaded latch assembly includes two latch levers pivoted to opposite sides of the fixed frame adjacent the aisle end of the seat with the two latch levers being interconnected by a handle extending therebetween.

9. The reversible seat of claim 7 wherein the spring loaded latching assembly includes one latch lever at one side of the fixed frame and a pin and slot connection between the upper and lower frames adjacent the other side of the fixed frame.

10. The reversible seat of claim 7 wherein the pivotal spring loaded latch assembly has an elongated slot receiving a pivot roller therein for selective movement of the spring loaded latch assembly relative to the pivot roller secured to said fixed frame.

11. The reversible seat of claim 7 wherein the lower frame is fixed by attachment to at least a vehicle wall and the spring loaded latch assembly is adjacent the end of the fixed frame remote from the wall.

12. The reversible seat of claim 7 wherein the upper frame has two spaced, downwardly extending locking pins with enlarged bottom heads at each end of the frame and the locking pins then adjacent the wall are urged by the spring loaded locking assembly into locking slots on the wall end of the fixed frame with the enlarged heads of the locking pins being below and in engagement with wall end of the frame adjacent the locking slots.

13. The reversible seat of claim 12 wherein the upper frame has an aperture at each of its ends which alternately receive a catch on the aisle end of the fixed frame when the seat is in one of its use positions.

* * * * *